United States Patent [19]
Buck

[11] 3,814,448
[45] June 4, 1974

[54] HYDRAULIC CHUCK

[75] Inventor: James R. Buck, Kalamazoo, Mich.

[73] Assignee: Buck Tool Company, Kalamazoo, Mich.

[22] Filed: Oct. 16, 1972

[21] Appl. No.: 297,632

[52] U.S. Cl. ........................ 279/1 J, 279/4, 279/110
[51] Int. Cl. ............................................. B23b 31/30
[58] Field of Search ........... 279/4, 1 J, 1 DA, 1 DC, 279/110

[56] References Cited
UNITED STATES PATENTS

| | | | |
|---|---|---|---|
| 1,815,562 | 7/1931 | Godfriaux | 279/4 |
| 2,587,893 | 3/1952 | Pridy et al. | 279/4 |
| 3,076,662 | 2/1963 | Kostyrka | 279/4 |
| 3,096,988 | 7/1963 | Skillin | 279/110 X |

Primary Examiner—Francis S. Husar
Attorney, Agent, or Firm—Woodhams, Blanchard and Flynn

[57] ABSTRACT

A chuck construction comprising a chuck body having a plurality of substantially radially movable jaw carriers slidably mounted thereon. At least one jaw carrier is drivingly connected to a driven piston which is slidably mounted on the chuck body. In one embodiment a driving piston is slidably mounted relative to the chuck body and, in association with the chuck body, defines a fluid pressure system which actuates the driven piston whereby movement of the driving piston, acting through an intermediate pressurized fluid, causes movement of the driven piston and its associated jaw carrier. The driving piston is connected to an actuating mechanism, such as a conventional draw bar. In one embodiment, all of the jaw carriers are connected to separate driven pistons which are operatively related to the fluid pressure system so that the driven pistons and their respective jaw carriers are individually slidably moved when the driving piston is moved. This chuck construction permits relative radial movement of the jaw carriers to compensate for workpiece eccentricity. In a further embodiment, the jaw carriers are mechanically interconnected to each other for simultaneous radial movement therewith and with this arrangement one or more jaw carriers as desired may be connected to a driven piston.

13 Claims, 6 Drawing Figures

HYDRAULIC CHUCK

FIELD OF THE INVENTION

This invention relates to a chuck construction and, more particularly, to an improved chuck construction having a plurality of radially movable jaw carriers and a fluid pressure system communicating with at least one of said jaw carriers for causing slidable movement of all of said jaw carriers between operative and inoperative positions.

BACKGROUND OF THE INVENTION

Chuck constructions employing a plurality of radially slidable jaw carriers disposed for gripping engagment with a workpiece have been extensively utilized. However, most of these prior chuck constructions have relied upon mechanical linkages connected between the jaw carriers and a power source for causing radial movement of the jaw carriers between operative and inoperative positions. The use of mechanical linkages has necessarily resulted in all of the jaw carriers being simultaneously moved through equal distances. These known chuck constructions have thus been unable to accurately compensate for workpiece eccentricity. Further, these known chuck constructions are often mechanically complex and are thus relatively expensive to manufacture and maintain.

In situations where eccentric workpieces are to be machined, it is generally necessary to utilize a chuck construction having a plurality of slidable jaw carriers which are individually manually adjustable in order to permit the jaws to compensate for workpiece eccentricity. However, this chuck structure is highly undesirable since it requires substantial time and manual manipulation to permit the workpiece to be clampingly mounted thereon. This obviously requires a high level of skill on the part of the operator and in any event often results in an inefficient and costly machining operation.

In order to overcome the disadvantages of the above-mentioned chuck constructions, attempts have been made to provide a chuck construction having suitable structure associated with the plurality of jaw carriers for permitting simultaneous movement of same while at the same time permitting the jaw carriers to compensate for workpiece eccentricity. However, all of the prior devices have, to the best of my knowledge, been relatively complex in terms of structure and operation.

A further problem associated with the prior known chuck constructions which have attempted to provide compensation for workpiece eccentricity has been an inability to cooperate with the workpiece without causing an undesired displacement thereof. Particularly, these prior devices, due to the manner in which the individual jaws are driven, normally tend to push the workpiece off center, so that while partial compensation does occur among the jaws, nevertheless the compensation is not complete in that the workpiece, upon being clamped, is no longer properly centered or aligned with the chuck.

Accordingly, it is an object of the present invention to provide an improved chuck construction which overcomes the above-mentioned disadvantages. Particularly, it is an object of the present invention to provide:

1. An improved chuck construction which includes a fluid pressure system associated with the chuck construction for permitting actuation of a plurality of jaw carriers.
2. A chuck construction, as aforesaid, wherein the fluid pressure system is defined within the chuck body and in one embodiment comprises a closed system which contains a predetermined quantity of pressure fluid therein disposed in communication with a driving device associated with at least one of the jaw carriers for causing slidable movement thereof.
3. A chuck construction, as aforesaid, wherein the fluid pressure system individually communicates with each of the slidable jaw carriers. Same may then move independently of each other to permit the plurality of jaw carriers to compensate for workpiece eccentricity or they may be mechanically interconnected to effect simultaneous and equal jaw movement.
4. A chuck construction, as aforesaid, wherein the fluid pressure system is a closed sytem and comprises a chamber of predetermined volume defined within the chuck body and having a driving piston slidably disposed therein, said chamber being operatively related to said jaw carriers and containing a predetermined quantity of fluid therein for causing actuation of said jaw carriers in response to movement of said piston.
5. A chuck construction, as aforesaid, wherein one or more of said jaw carriers has a double-acting driven piston associated therewith and disposed for communication with said chamber whereby pressurized fluid of said pressure system is capable of moving said jaw carriers in opposite radial directions in response to movement of said driving piston in opposite directions within said chamber.
6. A chuck construction, as aforesaid, wherein the driven pistons are disposed for slidable engagement with the respective jaw carriers by means of intermediate self-locking wedge means for preventing said jaw carriers from releasing the workpiece during the machining operation.
7. A chuck construction, as aforesaid, which can be manufactured simply and economically, which possesses a minimum number of parts, which is economical to maintain, and which readily compensates for workpiece eccentricity.

These and other objects of the present invention will be apparent to persons acquainted with devices of this type upon reading the following description and inspecting the accompanying drawings.

Certain terminology will be used in the following description for convenience in reference only and will not be limiting. The words "upwardly," "downwardly," "rightwardly" and "leftwardly" will designate directions in the drawings to which reference is made. The words "forwardly" and "rearwardly" will refer to a direction axially away from the front or work engaging face of the chuck and to the opposite direction, respectively. The words "inwardly" and "outwardly" will refer to directions toward and away from, respectively, the geometric center of the chuck and designated parts thereof. Said terminology will include the words above specifically mentioned, derivatives thereof and words of similar import.

SUMMARY OF THE INVENTION

In general, the objects and purposes of the present invention are met by providing a chuck construction comprising a chuck body provided with a plurality of substantially radial guideways. A jaw carrier is snugly but slidably disposed in each of the guideways for reciprocation therealong. A fluid pressure system is associated with the chuck construction for causing radial slidable movement of the jaw carriers. The fluid system includes a primary chamber defined within the chuck body and having a driving piston movably disposed therein, said driving piston being actuated by an external power source. The primary chamber is disposed in communication with a secondary chamber formed in the chuck body, which secondary chamber has a double-acting fluid-actuated driven piston slidably disposed therein. The driven piston is drivingly connected, as by means of a self-locking cam means, to one of the jaw carriers for reciprocating same radially within its respective guideway. In a preferred embodiment of the invention, the chuck body includes a plurality of secondary chambers each having a driven piston slidable therein and disposed in driving engagement with a respective jaw carrier. The pressurization of the fluid within the system due to movement of the driving piston causes movement of the driven pistons so that the jaw carriers are moved radially. The jaw carriers are movable through different radial distances to compensate for workpiece eccentricity due to the equalization of pressure throughout the closed system. Alternately, one or more jaw carriers may be connected to driven pistons and all jaw carriers mechanically interconnected to each other whereby all jaw carriers are simultaneously radially movable in a noncompensating manner.

DETAILED DESCRIPTION

FIGS. 1 to 5 illustrate therein one embodiment of a chuck construction 11 according to the present invention. The chuck construction 11 includes a substantially cylindrical chuck body 12 which, in the disclosed embodiment, is of a multipart construction. Chuck body 12 includes a substantially central annular portion 13 having a front plate 14 positioned adjacent the forward end thereof. An annular recess 16 is formed in the rearward end of the central annulus 13 and an annular support plate 17 is disposed therein. The support plate 17 is slightly smaller than the recess 16 to permit limited radial movement of the sleeve 13 relative to the support plate 17.

Figure 2:
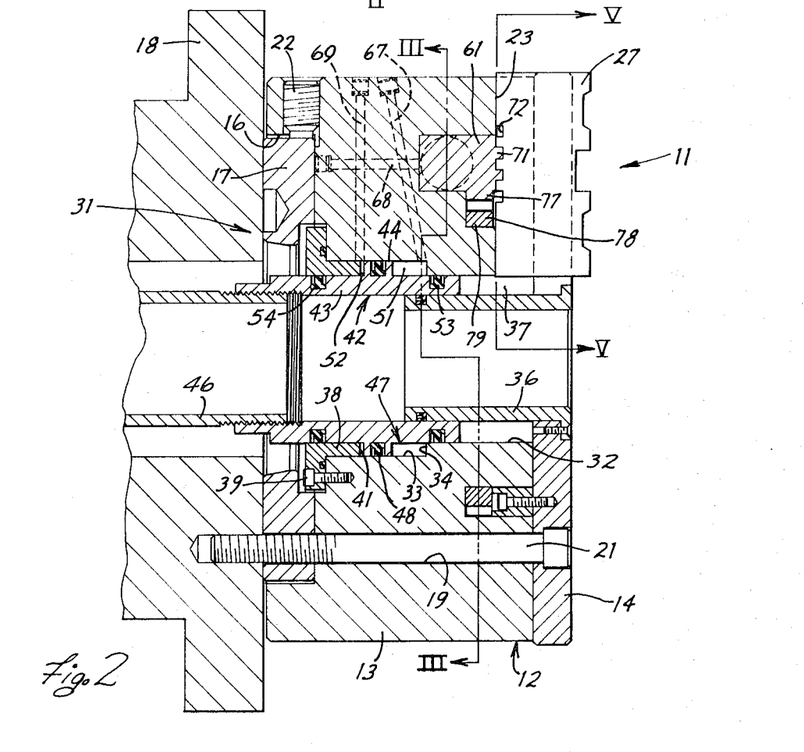
FIG. 2 is a fragmentary sectional view taken substantially along the line II—II of FIG. 1.

The support plate 17 is adapted to be disposed in engagement with the surface of a suitable mounting member, such as the face plate 18 of a lathe. The chuck body 12 is fixedly mounted on the face plate 18 by means of a plurality of elongated screws 21 which extend through substantially aligned openings 19 formed in the parts of the chuck body 12. The threaded end of each screw is disposed in threaded engagement with the face plate for fixedly mounting the chuck construction thereon. The openings 19 are preferably slightly larger than the diameter of the screws 21 to provide suitable clearance space therebetween to permit the sleeve portion 13 and front plate 14 to be radially adjusted relative to the support plate 17. For this purpose, a set screw 22 is provided on the sleeve portion 13 and is disposed in abutting engagement with the periphery of the support plate 17 for permitting the sleeve portion to be radially displaced a limited amount relative to the face plate 18 after the chuck construction has been mounted thereon.

Figure 1:
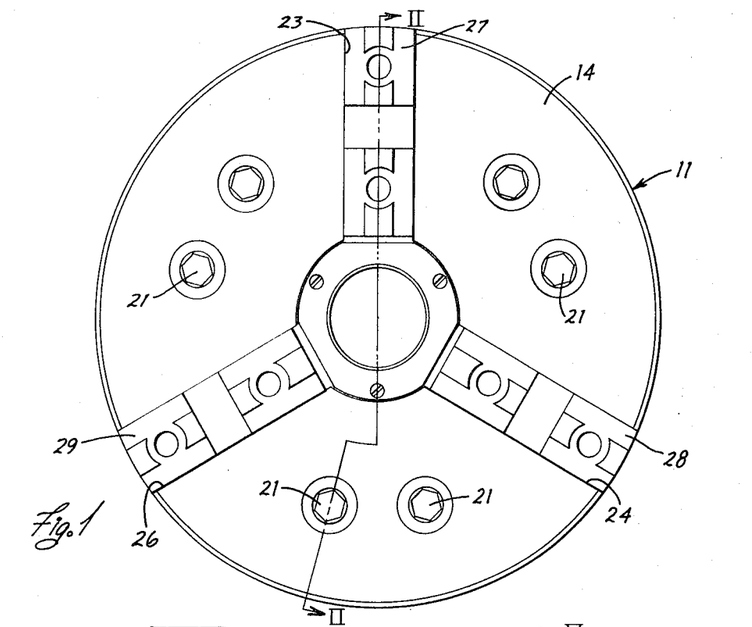
FIG. 1 illustrates therein a front elevational view of a chuck construction according to the present invention, same being taken substantially from the right side of FIG. 2.

The chuck body 12 is provided with a plurality of substantially conventional, radial guideways on the front surface thereof, there being three guideways 23, 24 and 26 in the illustrated embodiment. The guideways are substantially uniformily angularly spaced about the longitudinal axis of the chuck body, and have substantially identical jaw carriers 27, 28 and 29, respectively, snugly but slidably disposed therein. The jaw carriers 27, 28 and 29 are of substantially conventional construction and mount thereon conventional jaws designed for engagement with the desired workpiece. The construction as thus far described is essentially that of U.S. Pat. No. 2,639,157 to which attention is invited for further details.

The chuck construction of the present invention includes a closed fluid-actuating system 31 associated therewith for causing slidable movement of the jaw carriers within their respective guideways. The fluid system 31 is disposed substantially entirely within the chuck body 12 and, for this purpose, same is provided with a stepped bore extending longitudinally therethrough, which bore includes coaxially aligned bores 32 and 33 of different diameters having an annular radially extending shoulder 34 therebetween. An annular guide sleeve 36 has one end thereof supported on and fixedly secured to the front plate 14, and said guide sleeve extends axially rearwardly into and substantially through the small bore 32. Sleeve 36 is spaced radially inwardly from the wall defining the small bore 32 to provide an annular guide space 37 therebetween. A further guide sleeve 38 is disposed adjacent the rearward end of the chuck body 12 and is seated within the rearward end of the large bore 33. The rear guide sleeve 38 is fixedly connected to the central sleeve portion 13 by any conventional means, such as by screws 39. The rear guide sleeve 38 is of substantially larger diameter than the front guide sleeve 36 and has an inner diameter substantially equal to the diameter of the smaller bore 32. The forward axial end face 41 of the rear guide sleeve 38 is disposed opposite but axially spaced from the annular shoulder 34.

The front and rear guide sleeves 36 and 38 slidably support a primary or driving piston means 42 which, in the illustrated embodiment, comprises an elongated sleevelike slide 43 which has the forward end thereof slidably disposed within the annular guide space 37, whereby the inner and outer peripheral surfaces of the slide 43 are disposed for slidable engagement with the outer peripheral surface of the front guide 36 and the inner annular wall defining the small bore 32, respectively. The rearward end of the sleevelike slide 43 has the outer periphery thereof slidably supported on the inner periphery of the rear guide sleeve 38. The rearward end of the sleevelike slide 43 is also connected to a suitable reciprocating power source, as by being threadably connected to a conventional draw bar 46.

The sleevelike slide 43 has a piston portion 44 fixedly, here integrally, connected thereto. The piston portion 44 projects radially outwardly from the slide 43 and is disposed substantially midway between the ends of the slide 43, being confined for slidable movement between the opposed walls 34 and 41. The slide 43 and the wall defining the large bore 33, in conjunction with the opposed walls 34 and 41, define a primary annular chamber 47 therebetween. The piston portion 44 is disposed within said annular chamber 47 and is reciprocably movable axially thereof. Piston portion 44 has a resilient seal ring 48 positioned for sealing engagement with the wall defining the large bore 33, whereby the piston portion 44 thus divides the annular chamber 47 into two subchambers or compartments 51 and 52 disposed on opposite axial sides of the piston portion 44. The subchambers 51 and 52 are further sealed by conventional resilient seal rings 53 and 54 disposed adjacent the opposite ends of the slide 43, which seal rings respectively engage the wall of the small bore 32 and the inner wall of the rear guide sleeve 38.

The fluid system 31 also includes a secondary chamber 56 (FIG. 3) formed within the chuck body 12, which secondary chamber 56 is of substantially cylindrical cross-section and has its longitudinal axis disposed within a plane which is substantially perpendicular to the longitudinal axis of the chuck body and further disposed transverse, preferably perpendicular, to the direction of movement of the jaw carriers. The secondary pressure chamber 56 has a secondary or driven piston means 57 slidably supported therein. The piston means 57 includes in this embodiment a pair of opposed, substantially cylindrical pistons 58 and 59 slidably disposed within the chamber 56 and positioned on substantially opposite sides of a slide block 61. The pistons 58 and 59 have in this embodiment their adjacent ends positioned in abutting engagement with the opposite sides of the slide block 61, whereby the block 61 is slidable longitudinally of the chamber 56. The pistons 58 and 59 each have a resilient seal ring 62 thereon and disposed for sealing engagement with the surrounding wall of the chamber 56, whereby the chamber 56 is thus divided into a pair of subchambers or compartments 63 and 64 disposed adjacent the opposite ends of the piston means 57.

Figure 3:
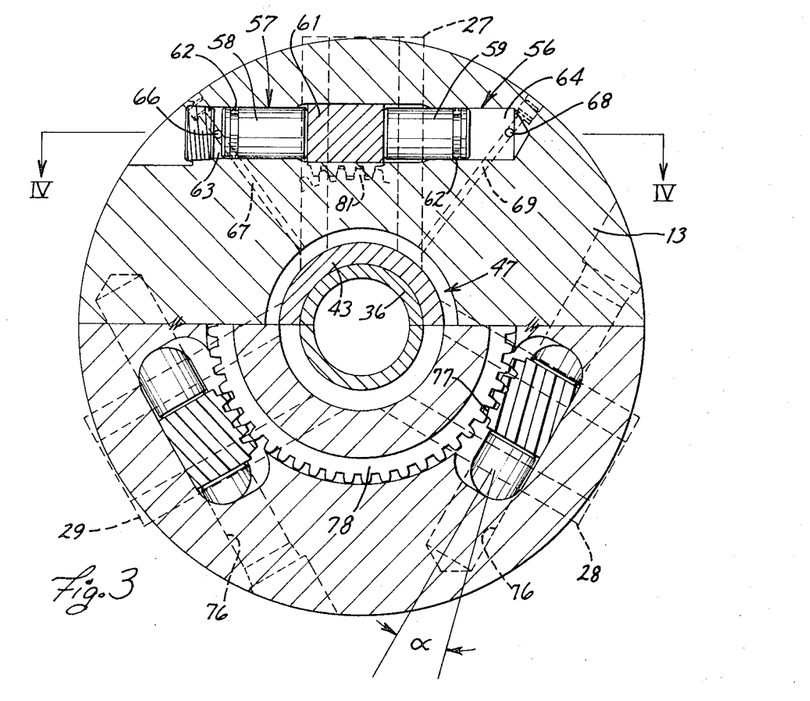
FIG. 3 is a sectional view, partially in cross-section, taken along the line III—III of FIG. 2.
Figure 4:
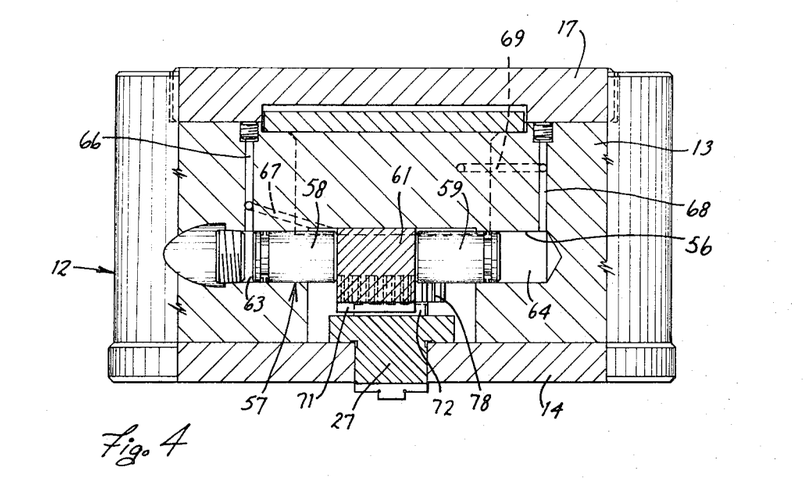
FIG. 4 is a sectional view taken substantially along the line IV—IV of FIG. 3.

The secondary subchamber 63 is disposed in fluid communication with the primary subchamber 51 by means of suitable passageway means extending therebetween, which passageway means in the illustrated embodiment include a substantially axially extending passageway 66 communicating with the secondary subchamber 63 and a substantially radially extending passageway 67 communicating with the primary subchamber 51, which passageways 66 and 67 intersect. The secondary subchamber 64 and the primary subchamber 52 are also disposed in fluid communication by means of an axial passageway 68 communicating with the secondary subchamber 64 and a substantially radially directed passageway 69 communicating with the primary subchamber 52, which passageways 68 and 69 also intersect.

Figure 5:
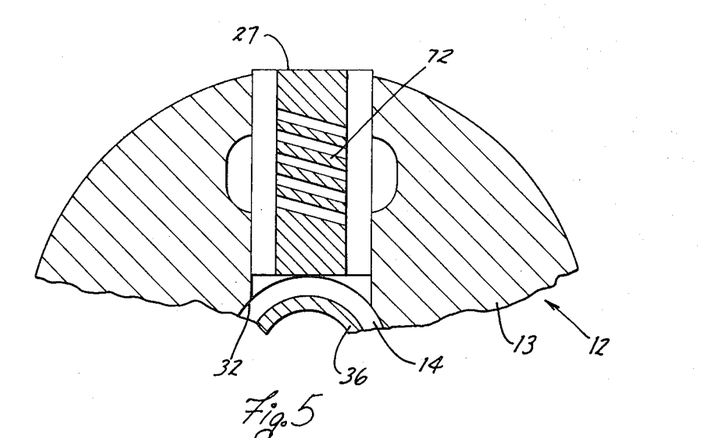
FIG. 5 is a fragmentary sectional view taken along the line II—II of FIG. 2.

The slide block 61 is drivingly connected to its respective jaw carrier 27 in any convenient manner. In this embodiment the connecting is effected by cam means coacting therebetween, which cam means in the illustrated embodiment includes a plurality of substantially parallel ridges 71 (FIGS. 2, 4 and 5) fixed on the front face of the slide block 61 and slidably disposed within substantially parallel grooves 72 formed in the rearward face of the jaw carrier 27. The ridges 71 and grooves 72 are substantially straight and extend at a small angle relative to the longitudinal direction of the secondary piston means 57, whereby the coacting ridges and grooves 71 and 72 function as a self-locking drive connection for preventing movement of the jaw carrier 27 due to forces applied thereto by the workpiece. As illustrated in FIG. 5, the ridges 71 extend at an angle $\alpha$ relative to the direction of slidable movement of the slide block 61, namely, a direction substantially perpendicular to the direction of movement of the jaw carrier. The angle $\alpha$ is preferably of a magnitude of approximately 14° so as to be self-locking while at the same time permitting efficient radial displacement of the jaw carrier when the slide block is moved due to imposition of pressure fluid on the secondary piston means 57.

To permit radial displacement of the other jaw carriers 28 and 29, there is provided a further pair of slide blocks 73 and 74 slidably disposed within suitable transversely extending passages or chambers 76 formed in the chuck body 12. The blocks 73 and 74 are identical to the slide block 61 and each includes substantially parallel ridges disposed in slidable engagement with substantially parallel grooves formed on the rear faces of the jaw carriers 28 and 29, respectively, which cooperating ridges and grooves are identical to the above-described ridges and grooves 71 and 72, respectively. Slidable displacement of the slide blocks 73 and 74 within their respective chambers thus causes a corresponding radial displacement of the respective jaw carriers 28 and 29 in substantially the same manner as caused by the coaction between the slide block 61 and its jaw carrier 27. However, in this embodiment, there are no fluid-actuated pistons associated with the slide blocks 73 and 74.

To permit displacement of the slide blocks 73 and 74 within their respective passages 76, each of the slide blocks 73 and 74 is provided with a gear rack 77 on the radially inner edge thereof, which gear racks 77 are disposed in meshing engagement with a conventional spur gear 78. The spur gear 78 is disposed substantially concentric with the longitudinally extending axis of the chuck construction. Gear 78 is rotatably supported on the sleeve portion 13 and is disposed within an annular recess 79 formed in the front face thereof. The spur gear 78 is also disposed in meshing engagement with a further gear rack 81 formed on the radially inner edge of the slide block 61, which gear rack 81 is identical to the gear racks 77 whereby linear displacement of the slide block 61 due to movement of the secondary piston means 57 is transmitted through the spur gear 78 to the other slide blocks 73 and 74 so that all three jaw carriers 27, 28 and 29 will thus be simultaneously radially displaced through substantially equal distances.

Figure 6:
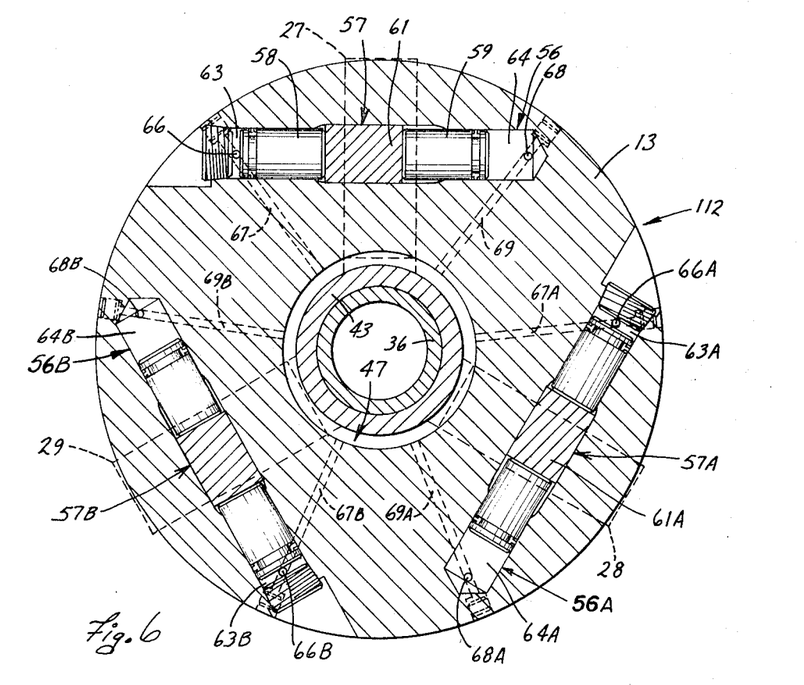
FIG. 6 is a sectional view similar to FIG. 3 and illustrating therein a modification of the present invention.

FIG. 6 illustrates therein a desirable and preferred embodiment of the present invention which is substantially identical to the embodiment illustrated in FIGS. 1–5 except that the spur gear 78 and the associated gear racks 77 and 81 have been eliminated so that the plurality of jaw carriers are each drivingly moved by their own respective secondary piston means, whereby the individual jaw carriers can be moved through different radial distances to compensate for workpiece eccentricity. The chuck construction of FIG. 6 includes therein the secondary piston means 57 slidably supported within the secondary pressure chamber 56, which secondary piston means includes the opposed pistons 58 and 59 disposed in abutting engagement with the opposite sides of the slide block 61. The block 61 is provided with ridges thereon which slidably coact with grooves formed in the rear face of one of the jaw carriers, such as the jaw carrier 27 illustrated in FIG. 1, for causing radial displacement of the jaw carrier as the slide block is displaced longitudinally of the chamber 56. The ridges and grooves are identical to the ridges and grooves 71 and 72, respectively, as explained above, and create a self-locking relationship between the slide block and the jaw carrier. Further, the pistons divide the secondary chamber into subchambers 63 and 64 which respectively communicate with the primary subchambers 51 and 52 through the passageways 66–67 and 68–69, respectively, in the same manner as above described in connection with FIGS. 1–5.

The other jaw carriers, such as the jaw carriers 28 and 29 illustrated in FIG. 1, are also disposed for coaction with fluid-actuated secondary piston means. For this purpose, the chuck body 112 has a further pair of secondary pressure chambers 56A and 56B formed therein, which chambers are identical to the chamber 56 and have their longitudinal directions extending substantially perpendicular to both the longitudinally and radially extending directions of the chuck construction. Secondary piston means 57A and 57B, identical to the secondary piston means 57, are slidably disposed within the secondary chambers 56A and 56B, respectively. The secondary piston means 57A and 57B divide their respective secondary chambers into subchambers 63A and 64A disposed adjacent the opposite ends of the secondary piston 57A, and subchambers 63B and 64B disposed adjacent the opposite ends of the secondary piston means 57B. The subchambers 63A and 63B each communicate with the primary subchamber 51A through connecting passageways 66A–67A and 66B–67B, respectively, which passageways are identical to the passageways 66–67 respectively. The secondary subchambers 64A and 64B are similarly interconnected to the primary subchamber 52 by intermediate fluid passageways 68A–69A and 68B–69B, respectively, which passageways are identical to the passageways 68–69 as described above.

OPERATION

The operation of the chuck construction according to the present invention will be briefly described to insure a complete understanding thereof.

To permit utilization of the chuck construction of FIGS. 1–5, the closed fluid-actuating system 31 is filled with a substantially incompressible pressure fluid, such as conventional hydraulic fluid. Assuming that the primary piston means 42 is in its retracted or leftward position (FIG. 2), then the secondary piston 57 will be disposed in the position illustrated in FIG. 3 and the plurality of jaw carriers 27, 28 and 29 will all be in their outward retracted positions. When it is desired to move the jaw carriers radially inwardly to cause them to clampingly engage a workpiece, the draw bar 46 and primary piston means 42 is moved forwardly (rightwardly in FIG. 2) causing the pressure of the fluid within the front subchamber 51 to increase. Some of the fluid from front subchamber 51 thus flows through the passages 66 and 67 into the secondary subchamber 63. The pressurized fluid in secondary subchamber 63 causes the secondary piston means 57 to slidably move longitudinally of the secondary pressure chamber 56 (rightwardly in FIG. 3), whereupon the grooves and ridges 71 and 72 coacting between the slide block 61 and the jaw carrier 27 cause the jaw carrier 27 to be radially slidably displaced inwardly within its respective guideway 23. The slidable movement of guide block 61 also causes a rotation of spur gear 78 whereby the remaining slide blocks 73 and 74 are likewise slidably displaced through distances equal to the displacement of the slide block 61, so that they also cause the remaining jaw carriers 28 and 29 to be slidably displaced radially inwardly simultaneously with and through distances equal to the radial displacement of the jaw carrier 27. Assuming continuing force on the draw bar 46, this action continues until all of the jaw carriers 27, 28 and 29 have been concentrically moved radially inwardly into clamping engagement with the workpiece. When the jaw carriers are being moved radially inwardly due to forward movement of the primary piston means 42, the pressure fluid disposed within the other secondary subchamber 64 is returned to the rearward primary subchamber 52 through the interconnecting passageways 68 and 69.

When it is desired to release the jaw carriers from engagement with the workpiece, then the draw bar 42 is retracted rearwardly (leftwardly in FIG. 2), whereupon the fluid within the rear primary subchamber 52 is pressurized and supplied through the passageways 68 and 69 to the opposite secondary subchamber 64. The secondary piston means 57 is thus longitudinally slidably displaced in the opposite direction (leftwardly in FIG. 3), which causes rotation of spur gear 78 in the opposite direction so that the three jaw carriers are then simultaneously and equally displaced radially outwardly to disengage the workpiece. The pressure fluid within the secondary subchamber 63 is returned through the passages 66 and 67 to the front primary subchamber 51 to thus return the chuck to its original condition, substantially as illustrated in FIGS. 1–5.

The operation of the embodiment illustrated in FIG. 6 is substantially identical to the operation described above except that the plurality of jaw carriers are no longer constrained for simultaneous and equal radial displacements. Rather, the jaw carriers are relatively movable and are thus able to compensate for workpiece eccentricity. When the draw bar and primary piston means are moved forwardly, the pressurized fluid is supplied from the front compartment 51 through the plurality of passageways 66–67, 66A–67A and 66B–67B to the secondary compartments 63, 63A and 63B, respectively, whereupon the secondary pistons 57, 57A and 57B are individually displaced within their respective chambers. This causes an axial displacement of their respective slide blocks 61, 61A and 61B whereby the coacting ridges and grooves cause the respective jaw carriers 27, 28 and 29 to be radially displaced inwardly relative to the chuck construction so as to engage the workpiece. However, if the workpiece is eccentric relative to the chuck axis so that one of the jaw carriers engages the workpiece prior to the remaining jaw carriers, then this will stop further radial displacement of said one jaw carrier. However, due to the pressure equalization of the fluid trapped within the system, the remaining jaw carriers continue to move radially inwardly due to slidable movement of their secondary piston means until the remaining jaw carriers also engage the workpiece. The equalization of pressure which occurs in the fluid throughout the closed system thus causes substantially equal clamping forces to be applied to the workpiece by each of the respective jaw carriers. Thus, the chuck construction illustrated in FIG. 6 permits the jaw carriers to compensate for workpiece eccentricity inasmuch as the individual jaw carriers are interconnected solely by the fluid system which permits the jaw carriers to be displaced through unequal distances while at the same time causes the plurality of jaw carriers to apply substantially equal clamping forces to the workpiece. The release of the jaw carriers in the chuck construction illustrated in FIG. 6 occurs in substantially the same manner as described above relative to FIGS. 1 to 5, and thus further description of same is not believed necessary.

Thus, the compensating chuck construction of the present invention, as illustrated in FIG. 6, is highly desirable since it permits the jaw carriers to conform to the eccentric configuration of the workpiece but, due to the manner in which the individual jaw carriers are moved by and interconnected through the medium of the closed fluid system, the jaw carriers do not tend to center the workpiece or to push it off center. Rather, the system permits the workpiece to remain in its desired relationship, with the jaw carriers radially compensating to provide equal clamping engagements with the workpiece. Further, the chuck construction of the present invention is highly desirable since it is adaptable to being a closed fluid-actuating system as shown which can be provided totally internally of the chuck body. Hence, where so built the system can be made extremely compact and efficient and thus requires little maintenance and repair.

Alternatively, of course the system including the gear 78 of FIG. 3 can, if desired, be applied to the three independently pressurized pistons of the FIG. 6 embodiment (or the pistons of FIG. 6 may be applied to all three slide bodies 61, 73 and 74 of FIG. 3). In such case, the resulting chuck will have the greater holding power of the three independently actuated chuck jaws as in FIG. 6 but said jaws will move equally and simultaneously as in FIG. 3.

As a further modification, the two-way pressure actuation of the slide blocks may be replaced by a one-way pressure actuation with a spring return.

While one of the advantages of the present invention lies in the fact that it can be made a closed pressure system as above described, at least some of the other advantages of the invention can be obtained by eliminating the piston means 42 and connecting the cylinder 51 with a source of external pressure, the remainder of the chuck remaining unchanged.

Although a particular preferred embodiment of the invention has been disclosed in detail for illustrative purposes, it will be recognized that variations or modifications of the disclosed apparatus, including the rearrangement of parts, lie within the scope of the present invention.

The embodiment of the invention in which an exclusive property or privilege is claimed are defined as follows:

1. In a chuck construction having a chuck body and a plurality of jaw carriers slidably mounted on said chuck body and movable relative thereto toward and away from a workpiece engaging position, said jaw carriers each having at least a radial component of motion relative to the longitudinal axis of said chuck construction, and actuator means for causing movement of said jaw carriers relative to said chuck body, the improvement wherein said actuator means comprises:

a source of fluid under pressure;

said chuck body including wall means defining a substantially closed chamber adapted to have said pressure fluid received therein;

piston means slidably disposed in said chamber and coacting with at least one of said jaw carriers for moving same relative to said chuck body;

means providing fluid communication between said source and said chamber, whereby transfer of fluid from said source to said chamber causes movement of said piston means, which movement of said piston means in turn causes a corresponding movement of said one jaw carrier; and mechanical means drivingly interconnecting said jaw carriers for causing all of said jaw carriers to be simultaneously moved through substantially equal distances in response to movement of said piston means;

said mechanical means including a gear member concentric with and rotatably supported on said chuck body, said piston means having a gear rack portion provided thereon and disposed in meshing engagement with said gear member, and each of said jaw carriers having a gear rack portion associated therewith and disposed in meshing engagement with said gear member.

2. In a chuck construction having a chuck body and a plurality of jaw carriers slidably mounted on said chuck body and movable relative thereto toward and away from a workpiece engaging position, said jaw carriers each having at least a radial component of motion relative to the longitudinal axis of said chuck construction, and actuator means for causing movement of said jaw carriers relative to said chuck body, the improvement wherein said actuator means comprises:

first wall means defining a substantially closed primary chamber adapted to have a substantially incompressible pressure fluid disposed therein, said primary chamber being substantially coaxially aligned with the longitudinal axis of said chuck body and disposed internally thereof;

primary piston means slidably disposed in said primary chamber for effecting pressurization of said pressure fluid;

second wall means defining a substantially closed secondary chamber adapted to have said substantially incompressible pressure fluid disposed therein;

second piston means slidably disposed in said secondary chamber and coacting with at least one of said jaw carriers for moving same relative to said chuck body; and passageway means providing fluid communication between said primary and secondary chambers, whereby movement of said primary piston means in one direction within said primary chamber causes pressurization and transfer of fluid from said primary to said secondary chamber for causing movement of said second piston means, which movement of said second piston means in turn causes a corresponding movement of said at least one jaw carrier;

said primary piston means comprising a sleevelike member coaxially aligned with and slidably supported on said chuck body, said chuck body and said sleevelike member coacting to define said primary chamber therebetween with said primary chamber having a substantially annular configuration, and said sleevelike member having a substantially radially extending flangelike piston portion disposed within said primary chamber and positioned in slidable and sealing engagement with said chuck body.

3. A chuck construction according to claim 2, wherein said primary piston means sealingly divides said primary chamber into first and second compartments disposed on opposite sides of said primary piston means;

wherein said secondary piston means divides said secondary chamber into third and fourth compartments disposed on opposite sides of said secondary piston means; and wherein said passageway means includes a first flow passage providing communication between said first and third compartments and a second flow passage providing communication between said second and fourth compartments;

whereby movement of said primary piston means in said first direction causes pressure fluid to be transferred from said first compartment to said third compartment for causing movement of said secondary piston means in one direction so that said one jaw carrier is moved toward said work engaging position, and whereby movement of said primary piston means in the opposite direction causes pressure fluid to be transferred from said second compartment to said fourth compartment for causing movement of the secondary piston means in the other direction so that said one jaw carrier is moved away from said position.

4. A chuck construction according to claim 2, wherein said first and second wall means each comprise a portion of said chuck body and define said primary and secondary chambers internally of said chuck body.

5. A chuck construction according to claim 2, wherein said secondary chamber is formed in said chuck body and is spaced radially outwardly from the longitudinal axis of said chuck construction, and wedge means coacting between said one jaw carrier and said secondary piston means for causing movement of said one jaw carrier in response to displacement of said secondary piston means within said secondary chamber.

6. A chuck construction according to claim 5, wherein the longitudinally extending direction of said secondary chamber lies within a plane which is substantially perpendicular to the longitudinal axis of said chuck construction, the longitudinal direction of said secondary chamber also being substantially transverse to the direction of movement of said one jaw carrier;

said piston portion of said primary piston means dividing said primary chamber into first and second compartments which are sealingly isolated from one another on opposite sides of said primary piston means, and said secondary piston means dividing said secondary chamber into third and fourth compartments which are sealingly isolated from one another on opposite sides of said piston portion; and said passageway means including a first flow passage providing fluid communication between said first and third compartments, and a second flow passage providing fluid communication between second and fourth compartments, whereby reciprocation of said primary piston means causes a corresponding reciprocation of said secondary piston means.

7. A chuck construction according to claim 2, further including mechanical means drivingly interconnecting said jaw carriers for causing all of said jaw carriers to be simultaneously moved through substantially equal distances in response to movement of said secondary piston means.

8. In a chuck construction having a chuck body and a plurality of jaw carriers slidably mounted on said chuck body and movable relative thereto toward and away from a workpiece engaging position, said jaw carriers each having at least a radial component of motion relative to the longitudinal axis of said chuck construction, and actuator means for causing movement of said jaw carriers relative to said chuck body, the improvement wherein said actuator means comprises:

first wall means defining a substantially closed primary chamber adapted to have a substantially incompressible pressure fluid disposed therein;

primary piston means slidably disposed in said primary chamber for effecting pressurization of said pressure fluid;

second wall means defining a substantially closed secondary chamber adapted to have said substantially incompressible pressure fluid disposed therein;

second piston means slidably disposed in said secondary chamber and coacting with at least one of said jaw carriers for moving same relative to said chuck body;

cooperating self-locking wedge means coacting between said secondary piston means and said one jaw carrier for effecting movement of said one jaw carrier in response to movement of said secondary piston means while preventing movement of said one jaw carrier due to application of externally applied forces thereto; and passageway means providing fluid communication between said primary and secondary chambers, whereby movement of said primary piston means in one direction within said primary chamber causes pressurization and transfer of fluid from said primary to said secondary chamber for causing movement of said second piston means, which movement of said second piston means in turn causes a corresponding movement of said at least one jaw carrier.

9. A chuck construction according to claim 8, wherein further secondary piston means are respectively associated with each of the remaining jaw carriers, each of the further secondary piston means being slidably disposed within a respective secondary chamber, and said passageway means providing fluid communication between each of said further secondary chambers and said primary chamber, whereby pressurization of the fluid within said primary chamber due to displacement of said primary piston means causes pressure fluid to be transferred to each of said secondary chambers for causing movement of each of said secondary piston means, whereby all of said jaw carriers are movable relative to said chuck body.

10. In a chuck construction having a chuck body and a plurality of jaw carriers slidably mounted on the chuck body and movable relative thereto toward and away from a workpiece engaging position, each jaw carrier having at least a radial component of motion relative to the longitudinal axis of said chuck construction, the improvement comprising:

compensating actuator means drivingly connected to said plurality of jaw carriers for permitting simultaneous movement of same toward said operative position and for permitting said plurality of jaw carriers to apply substantially equal gripping forces to said workpiece while permitting said individual jaw carriers to be moved through different distances to compensate for workpiece eccentricity said compensating actuator means including a closed fluid pressure system adapted to contain therein a predetermined quantity of a substantially incompressible pressure fluid;

said system including a primary fluid chamber adapted to contain therein said pressure fluid and first piston means slidably disposed within said primary chamber for causing pressurization of the fluid therein to cause movement of said jaw carriers toward said workpiece engaging position;

said system including a plurality of secondary chambers each being associated with one of said jaw carriers, each of said secondary chambers having secondary piston means slidably disposed therein and coacting with a respective jaw carrier for causing corresponding movement thereof when said secondary piston means is slidably moved within its respective secondary chamber;

self-locking wedge means coacting between each secondary piston means and its respective jaw carrier for causing each said jaw carrier to be linearly displaced in response to movement of its respective secondary piston means while preventing movement of said jaw carrier in response to externally applied forces; and said system further including passageway means providing fluid communication between each of said secondary chambers and said primary chamber for causing movement of said secondary pistons and said jaw carriers in response to displacement of said first piston means.

11. In a chuck construction having a chuck body and a plurality of jaw carriers slidably mounted on the chuck body and movable relative thereto toward and away from a workpiece engaging position, each jaw carrier having at least a radial component of motion relative to the longitudinal axis of said chuck construction, the improvement comprising:

compensating actuator means drivingly connected to said plurality of jaw carriers for permitting simultaneous movement of same toward said operative position and for permitting said plurality of jaw carriers to apply substantially equal gripping forces to said workpiece while permitting said individual jaw carriers to be moved through different distances to compensate for workpiece eccentricity;

said compensating actuator means including a closed fluid pressure system adapted to contain therein a predetermined quantity of a substantially incompressible pressure fluid;

said system including a primary fluid chamber disposed internally of the chuck body and adapted to contain therein said pressure fluid, said primary chamber being substantially concentric with the longitudinal axis of said chuck body, and first piston means slidably disposed within said chamber for causing pressurization of the fluid therein to cause movement of said jaw carriers toward said workpiece engaging position;

said system including a plurality of secondary chambers disposed internally of said chuck body and each being associated with one of said jaw carriers, each of said secondary chambers having secondary piston means slidably disposed therein and coacting with a respective jaw carrier for causing corresponding movement thereof when said secondary piston means is slidably moved within its respective secondary chamber;

said system further including passageway means providing fluid for communication between each of said secondary chambers and said primary chamber for causing movement of said secondary pistons and said jaw carriers in response to displacement of said first piston means.

12. A chuck construction according to claim 11, wherein said closed fluid system is of the double-acting type and includes pressure fluid compartments disposed on opposite sides of said first-mentioned piston means and on opposite sides of each of said secondary piston means for permitting movement of said jaw carriers in opposite directions in response to movement of said first-mentioned piston means in opposite directions.

13. In a chuck construction having a chuck body and a plurality of jaw carriers slidably mounted on said chuck body and movable relative thereto toward and away from a workpiece engaging position, said jaw carriers each having at least a radial component of motion relative to the longitudinal axis of said chuck construction, and actuator means for causing movement of said jaw carriers relative to said chuck body, the improvement wherein said actuator means comprises:

first wall means defining a substantially closed primary chamber adapted to have a substantially incompressible pressure fluid disposed therein;

primary piston means slidably disposed in said primary chamber for effecting pressurization of said pressure fluid;

second wall means defining a substantially closed secondary chamber adapted to have said substantially incompressible pressure fluid disposed therein;

second piston means slidably disposed in said secondary chamber and coacting with at least one of said jaw carriers for moving same relative to said chuck body;

passageway means providing fluid communication between said primary and secondary chambers, whereby movement of said primary piston means in one direction within said primary chamber causes pressurization and transfer of fluid from said primary to said secondary chamber for causing movement of said second piston means, which movement of said second piston means in turn causes a corresponding movement of said at least one jaw carrier; and mechanical means drivingly interconnecting said jaw carriers for causing all of said jaw carriers to be simultaneously moved through substantially equal distances in response to movement of said secondary piston means;

said mechanical means including a gear member concentric with and rotatably supported on said chuck body, said second piston means having a gear rack portion provided thereon and disposed in meshing engagement with said gear member, and each of said jaw carriers having a gear rack portion associated therewith and disposed in meshing engagement with said gear member.

* * * * *